United States Patent [19]

Kemper et al.

[11] 4,112,780
[45] Sep. 12, 1978

[54] VARIABLE SPEED TRANSMISSION DEVICE

[75] Inventors: Yves Jean Kemper, Birmingham, Mich.; Lucien Bigot, Nantes, France

[73] Assignee: Vadetec Corporation, Troy, Mich.

[21] Appl. No.: 783,776

[22] Filed: Apr. 1, 1977

[51] Int. Cl.² .................. F16H 15/06; F16H 15/16
[52] U.S. Cl. ................................... 74/191; 74/190
[58] Field of Search ................ 74/190, 191, 193, 690, 74/796, 63, 209; 180/70 R

[56] References Cited

U.S. PATENT DOCUMENTS

| Re. 29,328 | 8/1977 | Kemper | 74/690 |
|---|---|---|---|
| 1,022,845 | 4/1912 | Hipple | 74/190 |
| 1,050,704 | 1/1913 | Sparks | 74/190 |
| 1,069,473 | 8/1913 | Ricard | 74/190 |
| 1,468,401 | 9/1923 | Roberts | 74/193 |
| 1,844,703 | 2/1932 | Thompson | 74/193 |
| 2,764,029 | 9/1956 | Pernollet et al. | 74/193 |
| 3,955,432 | 5/1976 | Kemper | 74/796 |

FOREIGN PATENT DOCUMENTS

| 2,634,244 | 2/1977 | Fed. Rep. of Germany | 74/191 |
|---|---|---|---|
| 172,830 | 12/1967 | Fed. Rep. of Germany | 74/191 |
| 2,433,685 | 2/1975 | Fed. Rep. of Germany | 74/191 |

Primary Examiner—Samuel Scott
Assistant Examiner—William R. Henderson
Attorney, Agent, or Firm—Lane, Aitken, Dunner & Ziems

[57] ABSTRACT

A variable speed transmission device including a torque variator of the type in which a first rotatable element is in rolling friction engagement with a second nutatable element having an axis movable in a biconical path about the axis of the first element. The first element supports a pair of axially movable cone-like members fixed for rotation with the first element and each having exterior surfaces of revolution defined by a curved generatrix to be convex in axial section and converging away from a point of first and second element axes intersection. The rolling friction surfaces of the second element are defined by interior cylindrical surfaces on a tube-like member and means are provided for adjusting the angle of the second element axis with respect to the first to vary the radii at the point of frictional contact on the cone-like members. A third element rotatable on the first axis extends through the tube-like second member and is cut away to enable the frictional engagement of surfaces on the cone-like members with the internal surfaces of the second element. The third element carries adjustably eccentric journals having fluid control means operable in diammetrically opposite directions to vary the angle at which the axis of the second element intersects the axis of the first element. Input torque is preferably provided by a clutch to the third element whereas the variable speed output of the variator is transmitted through a multi-speed shiftable gear train.

23 Claims, 14 Drawing Figures

VARIABLE SPEED TRANSMISSION DEVICE

CROSS-REFERENCE TO RELATED APPLICATION

This application is related to U.S. Patent Application Ser. No. 738,472, filed Nov. 3, 1976 by the joint inventors named herein and commonly assigned with the present invention.

BACKGROUND OF THE INVENTION

This invention relates to improvements in variable speed transmission devices and more particularly, it concerns an improved transmission of the type in which torque is transmitted by rolling frictional engagement at two points at contact between a pair of first and second elements having surfaces of revolution angularly disposed on intersecting first and second axes, the first element being rotatable on the first axis whereas the second element nutates so that the second axis revolves in a biconical path about the first axis.

In a co-pending application for U.S. Patent, Ser. No. 706,291, filed July 19, 1976 by Yves Jean Kemper, there are disclosed several embodiments of a transmission or torque variator in which a gyroscopic couple is deployed at two points of rolling friction contact between a first element rotatable on its own axis and a second element having an axis revolvable about the first axis in a biconical path such that the second element undergoes nutational movement with respect to the first. In certain embodiments, the gyroscopic couple is depolyed to develop the normal force necessary to retain the rolling surfaces of the respective first and second element in frictional engagement with each other whereas in other embodiments, the normal force required for frictional engagement is developed by mechanical means opposed by inertial forces including the gyroscopic couple to minimize the load-supporting requirements of bearings used in the transmission. While both forms of the transmission, as thus characterized, have demonstrated great potential from the standpoint of providing an exceedingly well-balanced, variable speed torque transmission requiring a small number of easily machined components, the latter form in which the inertial forces oppose a mechanically induced normal friction force couple has shown particular promise because of the facility it provides for reducing both size and friction losses in bearings used to support the respective first and second elements.

Variation in angular velocity between an input shaft and an output shaft of such a transmission is effected by providing the rolling friction surfaces coupled to one of the shafts on a pair of generally conical members each having an apex half-angle approximately the same as the angle between the intersecting axes of the first and second elements. The conical surfaces converge from the point of first and second element axes intersection and are movable in the direction of convergence into engagement with annular rings carried by the second elements. The rings also are axially adjustable on the second element so as to engage the conical members at varying radial distances from the axis of the conical members. Inasmuch as the annular rings are of a fixed radius, the speed ratio of input and output shafts connected to the respective first and second elements will vary with the radius of the conical members at the point of rolling friction engagement.

Although various control devices are disclosed in the aforementioned co-pending application for controlling the axial positioning of the annular rings carried by one or the other of the first and second elements, the annular rings as well as the control mechanism for their axial adjustment represent a relatively complicated control organization in the overall basically simple transmission. Accordingly, there is room for improvement principally in the control mechanism necessary to the attainment of the variable transmission speed ratios.

SUMMARY OF THE PRESENT INVENTION

In accordance with the present invention, a transmission is provided in which frame supported drive input and output members are interconnected by a torque variator including a first element having a first axis fixed relative to the supporting frame, a second element having a second axis intersecting the first axis at a point of axes intersection, and a third element rotatable on the first axis and rotatably engaged with the second element to develop a biconical movement or nutation of the second element about the point of axes intersection and circumferentially of the first axis. The first element has a pair of rolling surfaces disposed about the first axis, one to each side of the point of axes intersection. The second element also is formed having rolling traction surfaces to engage those on the first at two points of rolling frictional engagement. A hydraulic control system is provided for adjusting the angle of intersection between the first and second axes to shift the two points of rolling frictional engagement in opposite axial directions.

The rolling surfaces on one of the elements are established by an interior cylindrical surface positioned about a pair of cone-like members supported for rotation as the other of the elements and for axial movement toward and away from the point of axes intersection, each of the cone-like members having exterior surfaces of revolution converging from the point of axes intersection and defined by curved, preferably circular generatrices. To enable both of the elements to be supported by simple radial bearings such that both elements are directly or positively supported on their respective axes in relation to the transmission frame, the radii of generatrix curvature is long and related geometrically to variations in the surface radius defined by the generatrix and to variations in the angle of axes intersection.

The third element extends within and through the rolling traction surfaces of the second element, is cut away to enable frictional contact of the rolling surfaces on the first element with those of the second, and carries at opposite ends cooperating adjustable bearing assemblies operated by hydraulic piston/cylinder units to vary the angle of axes intersection between the first and second elements. The nutating second element is grounded to the frame in a manner to prevent rotation thereof on the second axis by an unique double U-joint system positioned centrally and thus symmetrically with respect to the second axis. A fluid control system capable of operating the piston/cylinder units to adjust the respective angular positions of the second element is effectively provided by an externally controlled pump system carried by the third element of the transmission.

For a given input speed, the rotational speed of the transmission output, preferably an output shaft, may be varied continuously through the range of radii defined by the rolling surfaces on the cone-like members. Additionally, a gear-type transmission is connected to the cone-like members to provide multiple increments of such continuously variable speed ranges as well as a neutral to reverse the direction of output shaft rotation. Also, the transmission may be releasably coupled to a source of input torque by a clutch.

Among the objects of the present invention are therefore: the provision of an improved variable speed torque transmission; the provision of such a transmission in which a variation in transmission speed ratio is effected by variation in the angle of axes intersection between a rotatable element and a nutating element in frictional engagement with each other at two points of contact spaced equally from the point of axes intersection; the provision of such a transmission having an improved torque variator; the provision of such a torque variator in which all components are positively supported and controlled without need for complex supporting or control components; the provision of an improved double U-joint system for grounding the nutating element of such a torque variator with the frame thereof; the provision of a unique control organization for such a double U-joint system; the provision of a unique bearing support for the second element of such transmissions; the provision of such a transmission which may be easily coupled to a source of input torque by a releasable clutch; and the provision of such a transmission having an incremental output speed variation superimposed on the continuous speed ratio variation effected by the torque variator thereof.

Other objects and further scope of applicability of the present invention will become apparent from the detailed description to follow taken in conjunction with the accompanying drawings in which like reference numerals designate like parts.

DETAILED DESCRIPTION OF THE PREFERRED EMBODIMENTS

Figure 1:
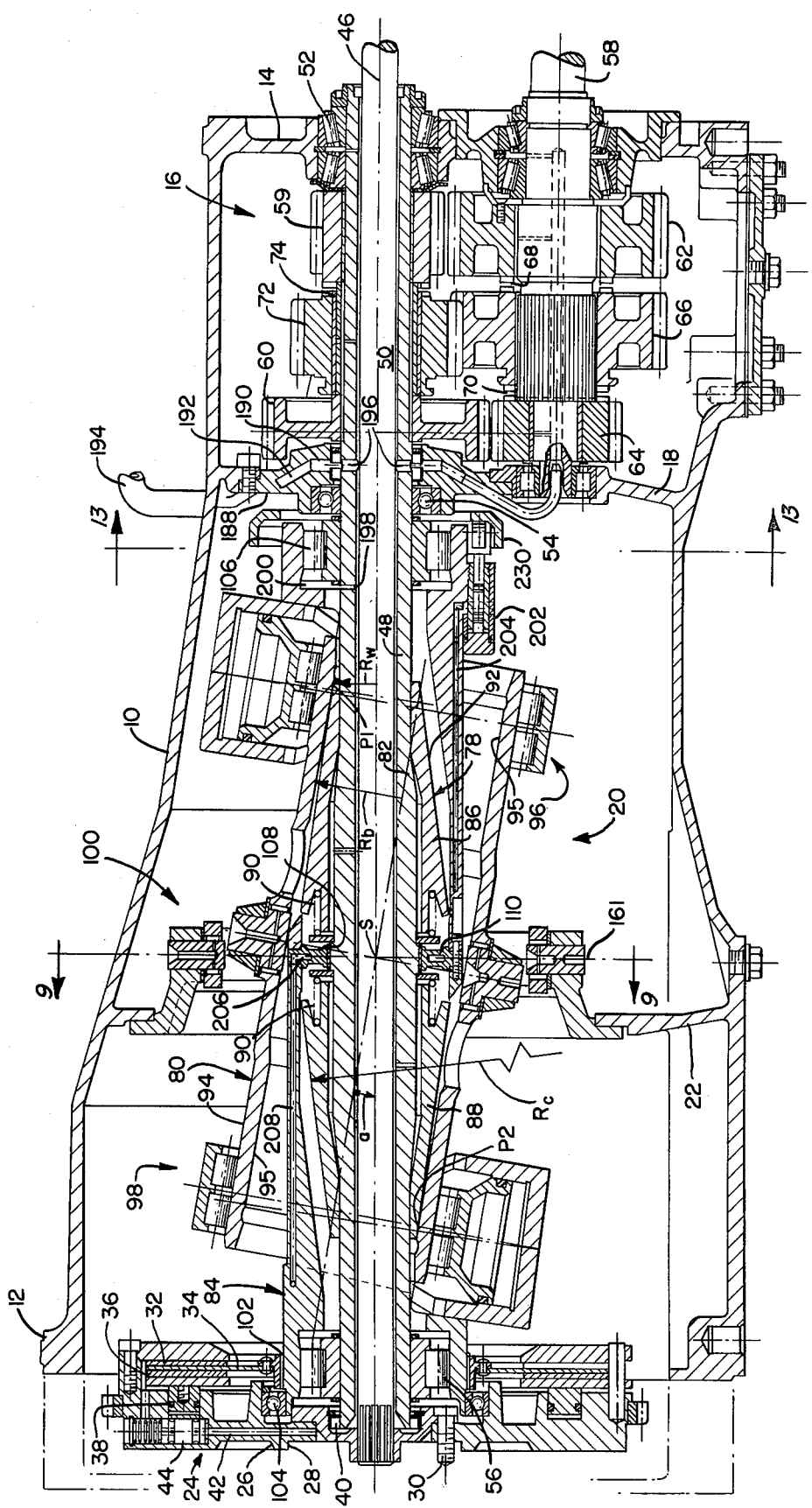
FIG. 1 is a longitudinal cross-section through the improved transmission of the present invention.

A preferred embodiment of the overall transmission in accordance with the present invention is shown in FIG. 1 of the drawings to include an enclosed frame or housing 10 having at one end a peripheral mounting flange 12 adapted to be secured directly to the frame or block of an engine or other suitable source of driving torque represented by the phantom line illustration to the left of FIG. 1. At its opposite end, the frame 10 is provided with an inwardly directed flange 14 delineating one end of a gear box generally designated by the reference numeral 16. An intermediate, inwardly directed flange 18 on the housing 10 separates the opposite end of the gear box 16 from a torque variator 20. As will be described in more detail below, the torque variator is connected in part to the frame 10 by way of a further inwardly directed flange 22.

Torque input to the transmission is preferably through a centrifugal clutch generally designated by the reference numeral 24 and located adjacent the peripheral mounting boss 12 on the frame. The clutch 24 is, in itself, conventional and as such includes a drive plate 26 having a central recess 28 through which torque transmitting pins 30 project for engagement with and support by an input shaft (not shown) appropriately journalled in the power source to which the transmission is connected in practice. The drive plate 26 carries a fixed annular friction pad 32 on one side of a driven disc 34. The disc 34 is adapted to be seized between the fixed friction pad 32 and an annular clamping pad 36 by an annular piston 38 movable by hydraulic fluid or oil supplied from an annular chamber 40, outwardly through a port 42 and under the control of a sensor 44. Thus, with no rotation of the drive plate 26, oil is fed past the sensor 44 and the disc 34 of the clutch is in a disengaged condition. As the drive plate 26 undergoes rotation, the oil in the port 42 will be moved outwardly by centrifugal force, fed against the annular piston 38 until the output disc 34 is engaged by the friction pads 32 and 36.

Extending longitudinally of the transmission on a first or primary transmission axis 46 are a pair of concentric torque transmitting shafts 48 and 50. The central shaft 50 is keyed directly to the clutch drive plate 26 and may be coupled at its end opposite from the clutch to auxiliary engine components (not shown) or other means to be connected in a direct drive relationship with the input torque to the transmission by way of the drive plate 26. The hollow shaft 48 is rotatable independently of the central shaft 50 and supported in the frame 10 on the axis 46 by bearings 52, 54 and 56. As will be seen from the description to follow below, the hollow shaft 48 in the disclosed embodiment is the output of the torque variator 20 and the input to the gear box 16. Torque output from the overall transmission is by way of a countershaft 58 coupled to the hollow shaft 48 through the gear box 16.

As shown in FIG. 1, the gear box 16 includes a pair of pinion gears 59 and 60 keyed for rotation with the hollow shaft 48 and in engagement at all times with pinion gears 62 and 64 which are freely rotatable on the output counter shaft 58. It will be noted that although the teeth of the respective gear sets 59, 62 and 60, 64 are shown out of engagement, these gears are engaged by reversing idler pinions (not shown) so that both gears of each set rotate in the same direction. A coupling gear 66 is splined for rotation with the counter shaft 58 and is slidable axially thereon. The gears 62, 66 and 64 are provided with interengaging axial sets of teeth 68 and 70 so that the gear 66 may be maintained in an intermediate position as shown in FIG. 1 or in positions of coupled engagement with either of the gears 62 and 64. Since the gears 62 and 64 will be driven by the gears 59 and 60 in the same direction as the hollow shaft 48, a first forward gear ratio may be effected by engagement of the coupling gear 66 with the gear 62. In this gear ratio, torque transmission from the shaft 48 will be from the gear 59 through an idler gear (not shown) to the gear 62 and the coupling gear 66 to the output counter shaft 58. A second forward gear ratio involves merely shifting the coupling gear 66 into engagement with the gear 64 so that the train will be through the gear 60 and another idler gear (not shown) to the gear 64, through the coupling gear 66 to the shaft 58. A reversal of the counter shaft 58 with respect to the hollow shaft 48 is effected by the intermediate position shown. In this condition, the coupling gear 66 is driven directly by a gear 72, normally rotatable freely on the shaft 48, but driven by engagement by axial teeth 74 with the gear 59.

In accordance with the invention, input torque operable to drive the clutch 24 at an angular velocity $\overset{\circ}{a}$ is transmitted to the gear box 16 by rotation of the hollow shaft 48 at an angular velocity $\overset{\circ}{\omega}$ as a result of the operation of the torque variator 20 through an infinite variation of speed ratios $\overset{\circ}{\omega}/\overset{\circ}{a}$. Although the several structural components of the torque variator which contribute to this operation will be described in detail below, an understanding of this basic operation may be gained by noting that the torque variator 20 is comprised of three assemblies which are movable as units or elements; namely, a first rotational element 78 concentric with the first axis 46, a second nutatable element 80 symmetrically disposed about a second axis 82 inclined with respect to the first axis 46 by an angle a and intersecting the first axis at a point of axes intersection S, and a third element 84 concentric with and rotatable on the first axis 46. The third element 84 functions in the manner of a support by which the angular disposition of the second axis 82 relative to the first axis 46 is maintained.

As may be observed in FIG. 1, the first element 78 of the torque variator 20 is established by a pair of cone-like members 86 and 88, splined for direct rotation with the hollow shaft 48 and slidable axially thereon in symmetry toward and away from the point S. The members 86 and 88 are biased away from each other in the disclosed embodiment by compression springs 90 though other suitable means such as hydraulic system or a system of opposed helical splines may be employed to this end. Each of the cone-like members 86 and 88 is identically shaped to define an outer rolling traction surface 92 having a variable radius $R_w$ with respect to the first axis 46. Also, it will be noted that the generatrix of each of the surfaces 92 is a curve having a long radius $R_c$ which is related to minimum ($\downarrow$) and maximum ($\uparrow$) values the radius $R_w$ and the angle $a$ under the equation:

$$R_c = \frac{R_w\uparrow - R_w\downarrow}{\cos a\downarrow - \cos a\uparrow}$$

The second or nutating element 80 of the torque variator is essentially a tube-like structure having concentric journal and rolling or traction surfaces of revolution about the second axis 82, such surfaces being designated respectively by the reference numerals 94 and 95 in FIG. 1. These surfaces are duplicated on opposite sides of the point of axes intersection S. Also it is to be noted that the rolling or traction surfaces of revolution 95 are of the same radius $R_b$ with respect to the axis 82 and that the surfaces 95 engage the surfaces 92 on the cone-like members 86 and 88 at two points of contact P1 and P2 spaced equally and oppositely from the point S.

The journal surfaces 94 on the second element 80 are rotatably engaged by bearing assemblies 96 and 98 carried as a unit with the third or support element 84 in a manner which will be described below. Also, a system of U-joints generally designated by the reference numeral 100, extend from the flange 22 on the frame 10 to the second element 80 to restrain the latter against rotation on the second axis 82 without in any way inhibiting nutation of the member 80 in a manner such that the second axis 82 may travel in a biconical orbit or path about the first axis 46 in symmetry with the point of axes intersection S.

In the disclosed embodiment, the third element 84 serves to drive the torque variator 20 and as such is coupled for rotation with the output disc 34 of the clutch 24 by exterior splines 102. Also, it will seen in FIG. 1 that the element 84 is supported for rotation at the one end thereof in the vicinity of the splines 102 independently of the shaft 48 by the previously mentioned bearing 56 and also independently of the drive plate 26 of the clutch by bearing 104. At its opposite end, the member 84 is journalled for rotation on the shaft 48 by a bearing 106. Also, a central bearing sleeve 108 is provided between the shaft 48 and a connecting ring or collar 110 forming a part of the element 84. An understanding of the manner in which torque is transmitted from the third element 84 to the nutating second element 80 may be gained by reference to FIGS. 2-6 of the drawings in which the structure of the element 84 is fully illustrated.

Figure 2:
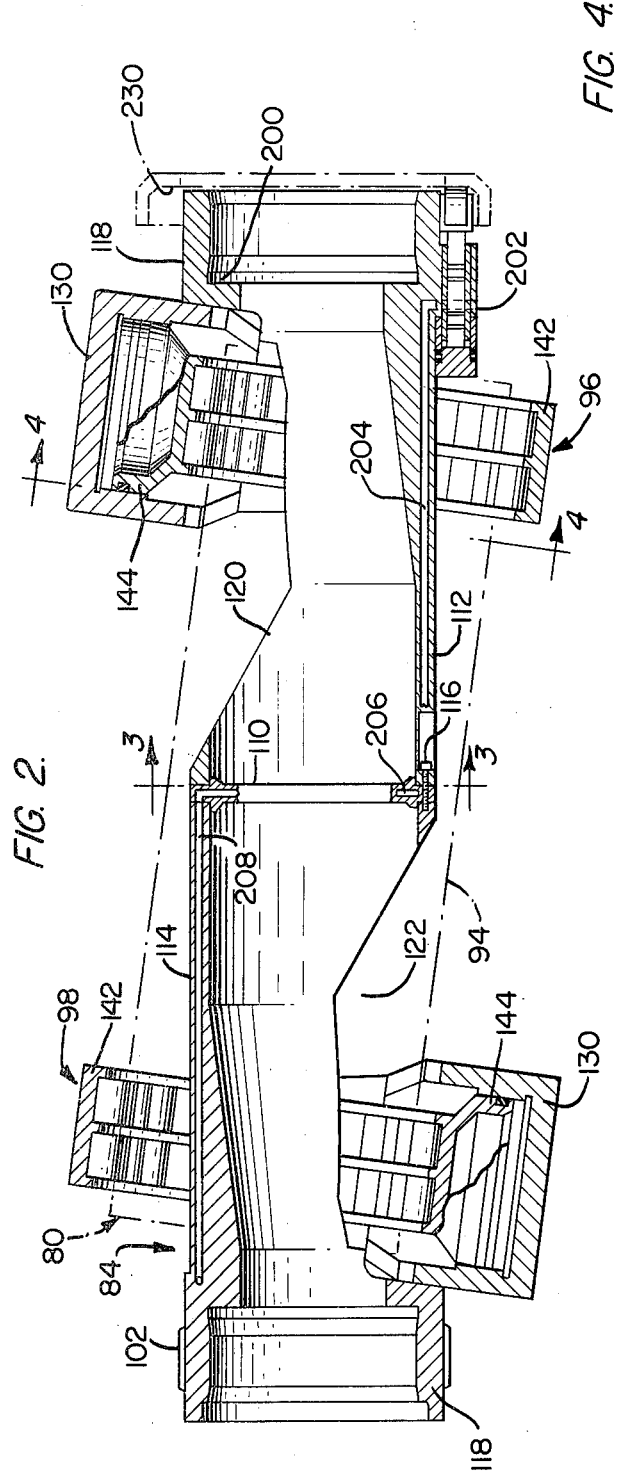
FIG. 2 is a cross-section illustrating a rotational component incorporated in the transmission of FIG. 1.

As shown in FIG. 2, the element 84 is constituted by a pair of generally similar longitudinal half-sections 112 and 114 secured in an end-for-end relationship against opposite faces of the connecting ring or collar 110 by a series of axial screw bolts 116 or other equivalent means. Each of the sections extends from the collar 110 as a sleeve-like structure to journal bosses 118. An intermediate portion of each section 112 and 114 is cut away to provide diammetrically opposite openings 120 and 122 in the assembled element. It will be appreciated that the openings 120 and 122 expose the cone-like members 86 and 88 so that the rolling tractionsurfaces 92 thereon are presented through the member 84.

Figure 3:
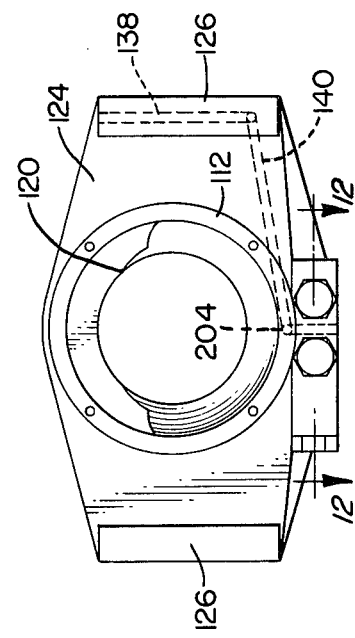
FIG. 3 is a fragmentary cross-section on line 3—3 of FIG. 2.
Figure 5:
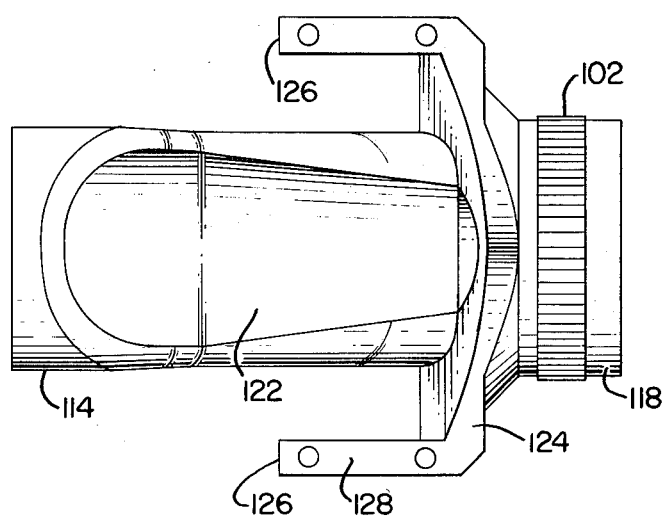
FIG. 5 is a plan view illustrating a half-section of the component illustrated in FIG. 2.
Figure 6:
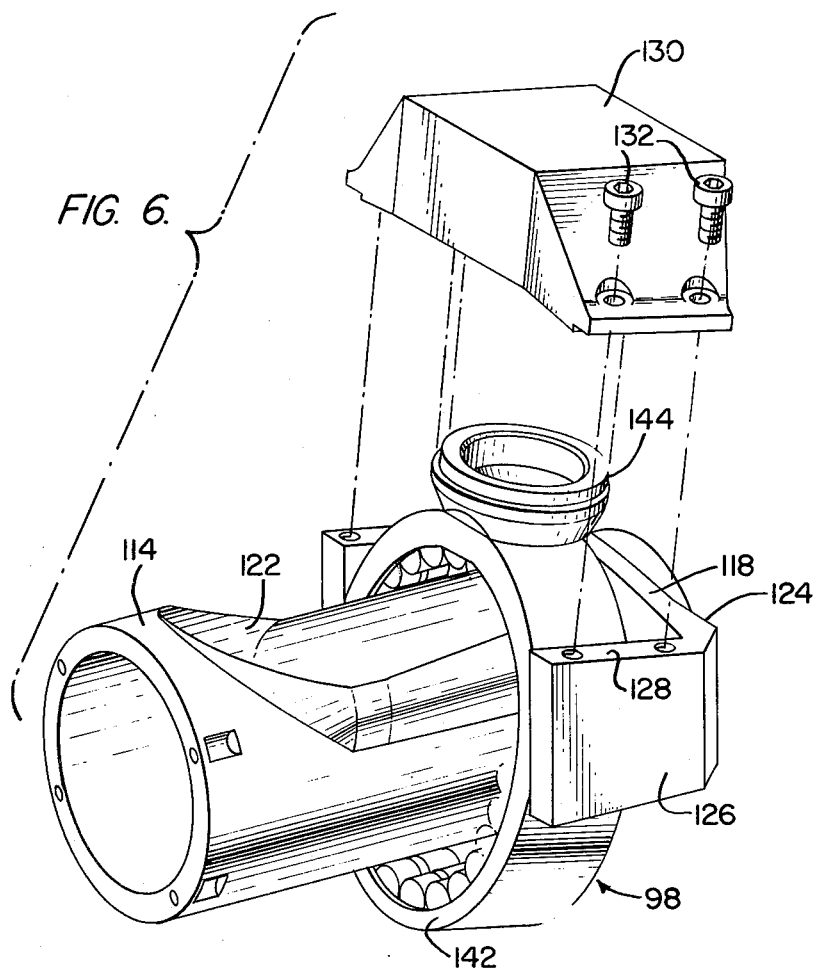
FIG. 6 is a fragmentary perspective view illustrating the element shown in FIG. 5.

Each of the journal bosses 118 is similarly shaped to define an integral yoke portion 124 shown most clearly in FIGS. 5 and 6 to include a pair of outwardly spaced longitudinally extending leg plates 126 each having an inclined bolting surface 128. A cylinder head bracket 130 is secured by bolts 132 to both leg plates 126 of each yoke 124. Each of the brackets 130 defines an inwardly facing cylinder 134 to which oil or other suitable hydraulic fluid may be fed by a passageway 136 formed in the bracket 130 and communicating with passageways 138 and 140 in each yoke 124 (FIG. 3).

In the embodiment of FIGS. 1-6, the bearing assemblies 96 and 98 each include a series of rollers to engage the journal surfaces 94 on the nutable second element 80 and which are supported by an outer race member 142. The outer race member 142 is formed with a piston 144 adapted to be received in the cylinder 134 and is further provided with external flats 146 slidable on the inner surfaces of the leg plates 126 of each yoke 124. It will be noted that the pistons 144 of the outer races 142 in the respective bearing assemblies 96 and 98 at opposite ends of the member 84 are diammetrically opposed. In light of this arrangement, the pistons 144 and cylinders 130 function as diametrically opposed extensible means by which the tube-like nutating member 80 may be adjustably tilted about the point of axes intersection S by simultaneous introduction of oil to or discharge of oil from the cylinders 134 of each of the bearing assemblies 96 and 98. Such a tilting adjustment will, of course, result in an adjustment of the second axis 82 to vary the angle $a$ between minimum ($a \downarrow$) and maximum ($a \uparrow$) values. The effect of such a variation in the angle $a$ results in simultaneous shifting of the contact points P1 and P2 toward or away from the point of axes intersection S. As a result of this movement of the contact points, the radius $R_w$ of the surfaces 92 on the cone-like members 86 and 88 will vary from a minimum value for $a \uparrow$ to a maximum value for $a \downarrow$. Since the radius $R_b$ of the rolling traction surfaces 95 on the nutating member 80 remains constant, the ratio $R_b/R_w$ or $\rho$ will vary directly with the angle $a$.

The operation of the torque variator 20 to transmit torque rotatably driving the third element 84 at a velocity $\mathring{\alpha}$, to output torque at infinitely varying speed ratios in the hollow shaft 48 at velocities $\mathring{\omega}$ may now be appreciated. In particular, rotation of the member 84 and correspondingly, coordinated orbital movement of the outer races 142 of the two bearing assemblies 96 and 98, will cause the member 80 to move in a nutational manner so that the axis 82 thereof is carried in a biconical path about the first axis 46 with the surfaces 95 and 92 in friction transmitting engagement with each other at the two points P1 and P2. Since the member 80 is prevented from rotation on the axis 82 by the U-joint system 100, the cone-like members 86 and 88 as well as the shaft 48 to which they are splined will be driven at the velocity $\mathring{\omega}$ in accordance with the equation $\mathring{\omega} = \mathring{\alpha}(1 - \rho)$. Since the radius $R_b$ is always greater than the radius $R_w$, the function $\rho$ will always be in excess of 1. As a result, $\mathring{\omega}$ is a directional reversal of $\mathring{\alpha}$.

With reference again to FIGS. 2-6 of the drawings, it will be noted that the bolting surfaces 128 on the leg plates 126 of each of the yokes 124 is inclined so that the axis of each cylinder 134 is at an angle with respect to the axis 46 of the element 84. This angle is selected to be approximately one-half the value of variation in the angle $a$ or midway between $a \uparrow$ and $a \downarrow$. Also, the pistons 144 are constructed to facilitate a degree of axial misalignment with the axis of the cylinders 134 to accomodate variations in the angle $a$.

Figure 7:
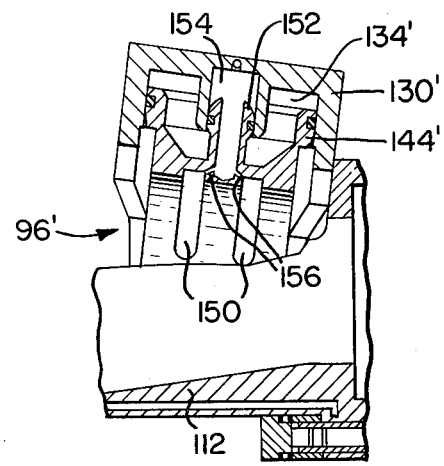
FIG. 7 is a fragmentary cross-section illustrating alternative embodiment of bearing assembly employed in the present invention.
Figure 8:
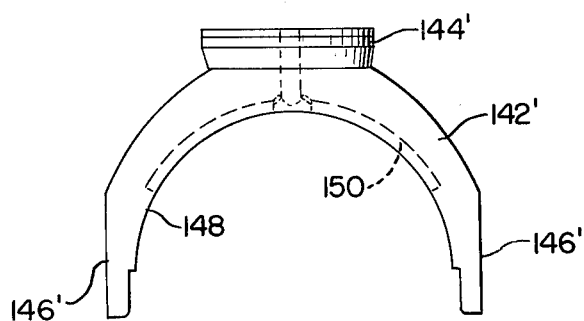
FIG. 8 is a side elevation illustrating one of the components of the bearing assembly shown in FIG. 7.

In FIGS. 7 and 8 of the drawings, an alternative form of the bearing assemblies 96 and 98 is shown with parts corresponding to those of the assemblies 96 and 98 being designated by like reference numerals but primed. Hence, in the alternative embodiment of FIGS. 7 and 8, the piston 144' is provided on a bearing body 142' having external flats 146' for sliding movement with respect to the yoke 124 in the same manner as the outer race 142 of the bearing assemblies 96 and 98 previously described. In this instance, however, the inner surface of the body 142' is provided with a semi-cylindrical bearing surface 148 engagable directly with the journal surfaces 94 on the tube-like nutating member 80. The surface 148 is provided with oil slots 150 to provide a hydrostatic bearing between the body 142' and the journal surfaces 94 on the nutating member. The piston 144' is modified to include a sliding seal nipple 152 receivable in a central chamber 154 to which oil is supplied in the same manner as it is to the cylinder 134' for actuating the piston 144'. The oil slots 150 are in communication with the nipple 152 by ports 156.

Although the alternative embodiment of the bearings illustrated in FIGS. 7 and 8 functions in all respects like the bearing assemblies 96 and 98 in the embodiment of FIGS. 1-6, the alternative embodiment provides improved operation in at least some applications of the overall transmission by reducing friction between the bearings and the tube-like nutating member 80. In particular, and assuming friction losses of a hydrostatic bearing to be comparable with that of a roller bearing, friction is reduced as a result of minimizing the surface contact in the bearing.

Figure 9:
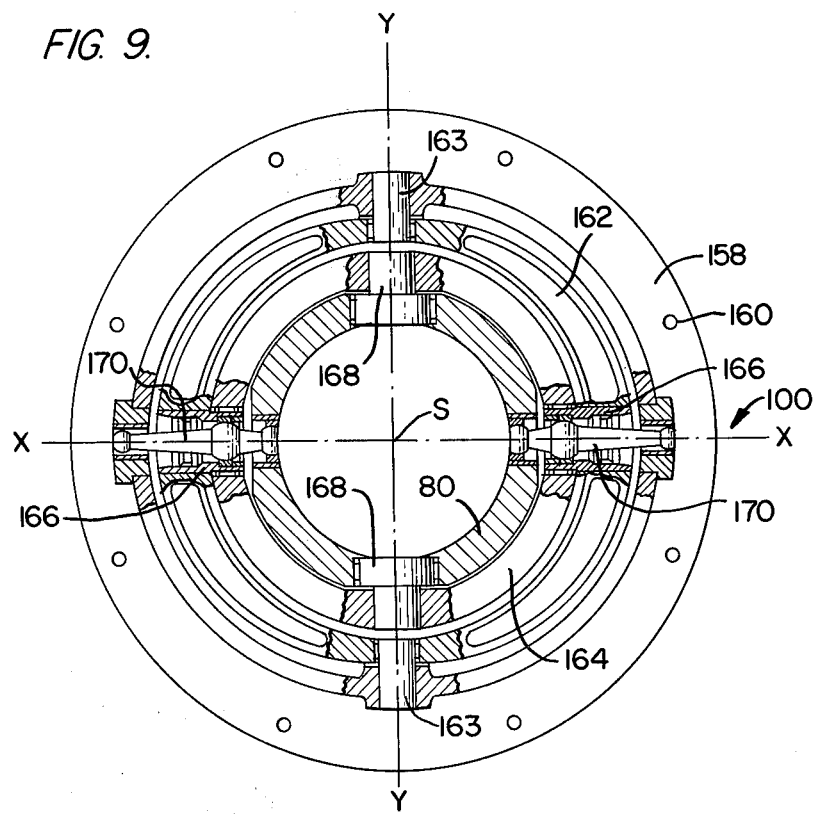
FIG. 9 is a fragmentary cross-section on line 9—9 of FIG. 1.
Figure 10:
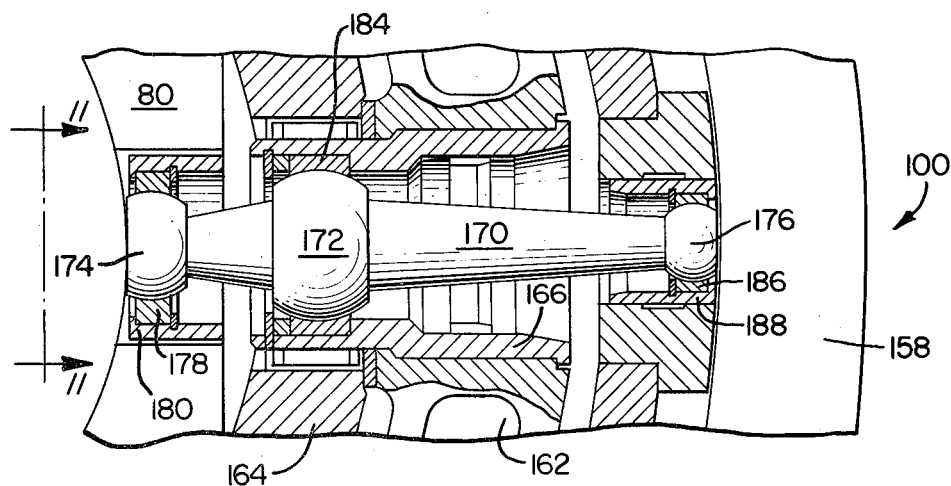
FIG. 10 is an enlarged fragmentary cross-section of components illustrated in FIG. 9.
Figure 11:
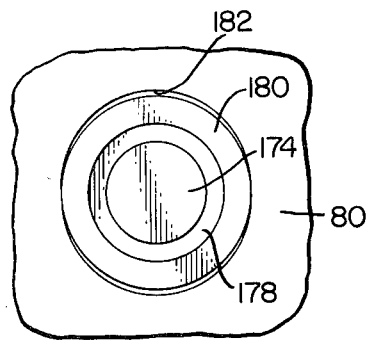
FIG. 11 is an end elevation as shown on line 11—11 of FIG. 10.

In FIGS. 9-11 of the drawings, the U-joint system 100 by which the nutating member 80 is interconnected with the frame 10 to prevent rotation of the member 80 about the axis 82 is more clearly shown to include an exterior mounting flange or ring 158 having a plurality of bolt holes 160 for securement to the inwardly directed flange 22 of the frame 10 as shown in FIG. 1 of the drawings. In FIG. 9, a pair of mutually perpendicular transverse pivot axes X—X and Y—Y are shown and lie in a plane 161 intersecting the point of axes intersection S. The system disclosed may be characterized as a double U-joint and as such includes a first outer ring 162 pivoted on the axis Y—Y by trunnion journals 163 in the mounting ring 158 and a second inner ring 164 pivoted from the outer ring 162 on the axis X—X by a pair of trunnion sleeves 166. The nutating member 80 is pivotally supported from the inner ring 164 on the axis Y—Y by trunnions 168.

Although the use of a single U-joint (a system in which only one of the rings 162, or 164 is used with trunnion support of the member 80 from a single ring on one of the perpendicular transverse axes and the ring pivotted from the mounting ring 158 on the other of such axes) would effect a universal grounding of the member 80 with the frame, the angular disposition of the tube 80 in the context of rotation about the axis 82 would not be constant as will be appreciated by those familiar with the art relating to U-joints. While this condition is corrected by the use of a double U-joint, the common pivot point S of both rings 162 and 164 is best practiced where the relative movement of both rings 162 and 164 is controlled. To this end, a pair of swivel arms 170 are disposed on the axis X—X. As shown most clearly in FIG. 10 of the drawings, the arm 170 is provided with spherical bearing surfaces 172, 174 and 176 intermediate its length and at opposite ends respectively. The spherical bearing 174 is received in a socket 178 carried by an externally circular sleeve 180 to establish one of a pair of end fulcrums for the arms 170. The sleeve 180, in turn, is received in an oblong slot 182 in the nutating member 80. The sleeve 180 is, therefore, capable of sliding movement in the slot 182 and also with a measure of freedom in a plane perpendicular to the axis 82 of the member 80 or the plane 161. The intermediate spherical bearing 172 is pivoted in a socket 184 carried directly by the trunnion sleeve 166 to establish an intermediate fulcrum at which the inner and outer rings 162 and 164 are pivotally interconnected on the axis X-X. The socket 184 is fixed against axial movement in the trunnion sleeve 166. The spherical bearing 176 is pivoted in a socket 186 to establish the other of the pair of end fulcrums afore-mentioned. The socket 186 is carried by a sleeve 188 for axial movement relative to the mounting ring 158.

As a result of this organization of the control arms 170, the member 80 is free to undergo nutating movement relative to the frame 10 and maintain a truly constant non-rotatable orienatation on the axis 82 while the relative angular orientation of the rings 162 and 164 is controlled. The U-joint system is, therefore, prevented from locking as might occur if both rings were completely free to pivot on the respective trunnion axes X—X and Y—Y.

Reference is now made to FIGS. 1-4 and 12-14 of the drawings which illustrate a fluid system for both lubricating the transmission and controlling the actuation of the pistons 144 to change the angle $a$ at which the axes 46 and 82 intersect. As shown in FIG. 1, the inwardly directed flange 18 on the frame 10 supports a hub 188 which supports the bearing 54 and in addition, defines an annular chamber 190 to which oil is fed by a passageway 192 communicating with an external supply of oil represented by a hose fitting 194. The chamber 190 communicates through the hollow shaft 48 by ports 196 so that oil may pass from the chamber 190 through the annulus extending along the complete length of the concentric shafts 48 and 50. The shaft 48 is further provided with radial ports such as a port 198 through which oil passing between the shafts 50 and 48 will be thrown outwardly by centrifugal force alone or combined with system pressure under which the oil is passed to the annular chamber 190. Although various additional lubrication passages are illustrated in FIG. 1 of the drawings, it is believed that further description of these passages is unnecessary to a complete understanding of the present invention.

The bearing boss 118 on the half-section 112 is provided with an internal oil collection groove 200 which serves as a reservoir for the supply of oil to an oil pump 202 supported directly by the member 84. Although the details of the pump 202 will be described in more detail below with reference to FIGS. 12-14, it will be observed in FIGS. 1-4 that a passageway 204 extends from the pump 202 and communicates with an annular passageway 206 in the connecting ring 110. The annular passageway 206 further communicates with an axial passageway 208 extending to the bearing boss 118 and yoke 124 of the other half-section 114. Communication with each of the cylinders 134 at opposite ends of the member 84 is as described above with respect to FIGS. 3 and 4 and including the passageways 136, 138 and 140.

Figure 12:
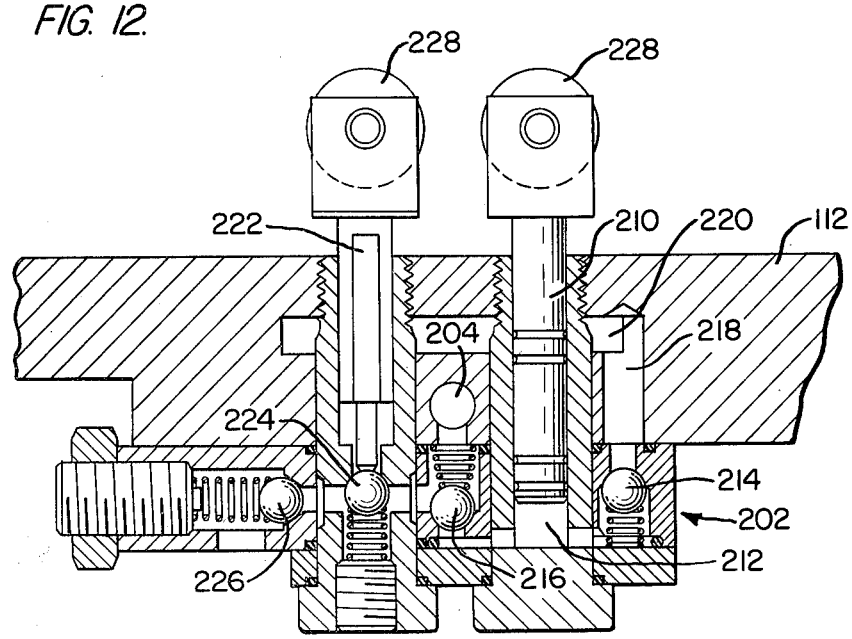
FIG. 12 is an enlarged fragmentary cross-section on line 12—12 of FIG. 3.

As shown most clearly in FIG. 12, the pump 202 is provided with a reciprocal pumping plunger 210 operable in a cylindrical bore 212 having an inlet check valve 214 and a one-way outlet valve or ball check 216. The valve 214 communicates with the annular track 200 by way of a port 218 and a slot 220 which serves as a small storage reservoir of oil for the pump. The outlet check valve 216 is in communication with the port 204 such that upon reciprocation of the plunger 210, oil will be fed under pressure to the passageway 204 and ultimately to the piston cylinders 134 in a manner to increase the inclination of the nutating member 80 with respect to the axis 46 or to increase the angle $a$.

A dumping valve arrangement is positioned adjacent the pump and as shown in FIG. 12 includes a plunger 222 adapted to moved against a ball check 224 to open communication of the port 204 with a dump valve 226. Thus, it will be appreciated that when the ball check 224 is moved to an unseated position, both discharge from the chamber 212 and oil from the passage way 204 may be passed directly through the dump valve 226.

Figure 13:
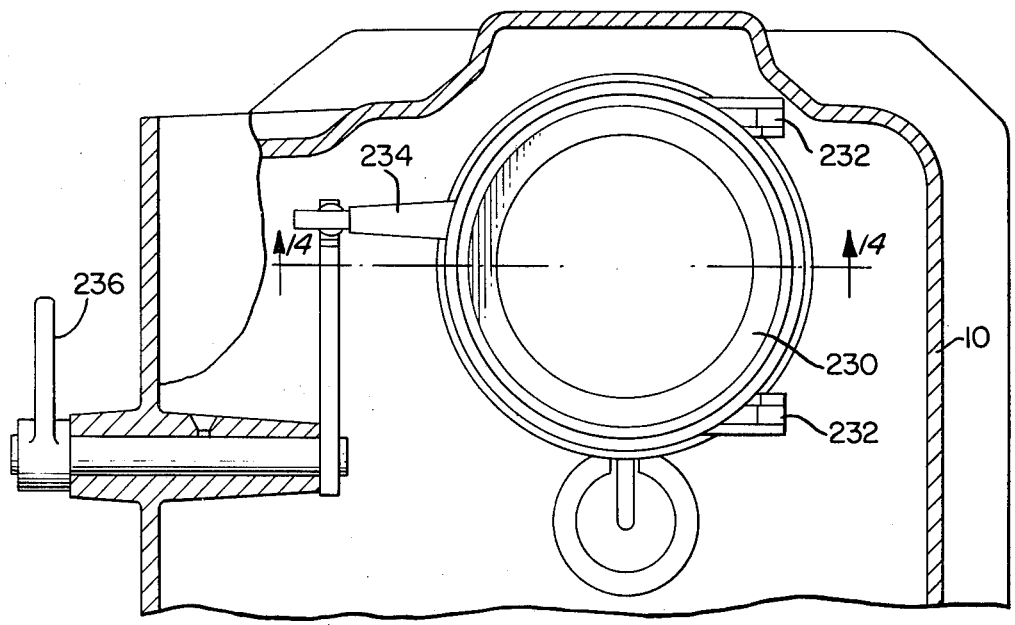
FIG. 13 is a fragmentary cross-section on line 13—13 of FIG. 1.
Figure 14:
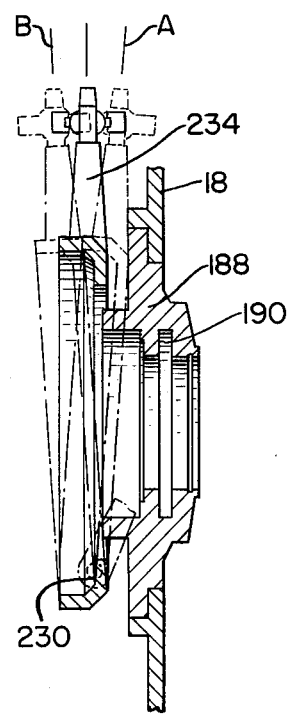
FIG. 14 is a cross-section on line 14—14 of FIG. 13.

The manner in which the pump and dump valve arrangement illustrated in FIG. 12 are actuated and controlled may be seen by reference to FIGS. 1, 13 and 14 of the drawings. Both the dump valve rod 222 and the plunger 210 support rollers in a position to engage an annular track 230 pivotally supported from the hub 188 by pintels 232. An arm 234 extends from the ring defining the track 230 on the side thereof opposite from the pintels 232 and is engaged by a control linkage 236 for pivotal movement between three positions depicted in FIG. 14 of the drawings. Thus, when the track 230 is maintained in a plane truly perpendicular to the axis 46, no pumping action will occur nor will the dump valve 224 be opened. Accordingly, the condition of the pistons 144 will be stable in this position of the track 230. Pivotal inclination of the track 230 to the position represented by the line A in FIG. 14 will result in reciprocation of the plunger to pump oil into the cylinders 134. The dump plunger 222 will be retracted away from the dump valve 224 in this position of the track 230. If the track is pivoted to the position B, however, the plunger 222 will unseat the dump valve 224 causing fluid to be exhausted from the cylinders 134 and correspondingly bring about movement of the pistons in the other direction.

Thus it will be appreciated that as a result of the present invention a highly effective torque transmitting system is provided by which the aforementioned objectives are completely fulfilled. It will also be appreciated by those skilled in the art that various modifications and/or changes may be made in the disclosed embodiment without departures from the inventive concepts mainfested thereby. Accordingly, it is expressly intended that the foregoing description is illustrative of a preferred embodiment only, not limiting, and that the true spirit and scope of the present invention be determined by reference to the appended claims.

We claim:

1. In a variable speed transmission having a frame, drive input means, drive output means, and means interconnecting the input and output means including a first element having a first axis fixed relative to the frame, a second element having concentric rolling and journal surfaces of revolution about a second axis intersecting the first axis at a point of axes intersection, a third element rotatable on the first axis and having journal means to engage the journal surfaces of the second element during movement of the second axis in a biconical path circumferentially about the first axis, the first element having a pair of rolling surfaces disposed about the first axis, one on each side of the point of axes intersection, the rolling surfaces of the second element being disposed also one on each side of the point of axes intersection, the respective rolling surfaces on the first and second elements being in rolling frictional engagement at two points in a plane containing the first and second axes and located one on each side of the point of axes intersection, and means urging the respective rolling surfaces on the first and second elements into rolling frictional engagement with each other at the two points of rolling frictional engagement, the improvement comprising:

means establishing an interior cylindrical surface to define the rolling surfaces of one of the elements;

a pair of members supported for rotation with the other of the elements and for axial movement toward and away from the point of axes intersection, each of said members having exterior surfaces of revolution defined by a curved generatrix to be convex in axial section and generally inclined oppositely and symmetrically from the point of axes intersection, said exterior surfaces of revolution establishing the rolling surfaces on the other of the elements;

means defining the third element and including a sleeve-like member extending between the rolling surfaces of the first and second elements and having openings to enable the rolling frictional engagement of the respective rolling surfaces at the two points containing the first and second axes; and means carried by the third element for adjusting the angle of intersection between the first and second axes to shift the two points of rolling frictional engagement in opposite axial directions along said member thereby to vary the radii of the rolling surfaces on the other element at the two points of rolling frictional engagement.

2. The apparatus recited in claim 1, wherein said interior cylindrical surface establishing means defines the rolling surfaces of the second element and the first element includes said pair of members.

3. The apparatus recited in claim 2, wherein the journal means of the third element are located at opposite ends of the second element and movable in diametrically opposite directions relative to the third member, and including a pair of piston/cylinder devices for positioning the journal means symmetrically about the point of axes intersection.

4. The apparatus recited in claim 3, wherein said piston/cylinder devices comprise cylinder defining means carried by said sleeve-like member and a piston operable in said cylinder and fixed to the journal means.

5. The apparatus recited in claim 2, wherein the journal surfaces of the second element are exterior surfaces of said cylindrical surface establishing means.

6. The apparatus recited in claim 5, wherein the journal means of the third element comprises an antifriction bearing circumscribing the journal surfaces of the second element.

7. The apparatus recited in claim 5, wherein the journal means of the third element comprises hydrostatic bearings having semicylindrical bearing surfaces to engage the journal surfaces of the second elements at diametrical opposite sides thereof.

8. The apparatus recited in claim 2, including a U-joint system interconnecting the second element and the frame to prevent rotation of the second element on the second axis.

9. The apparatus recited in claim 8 wherein said U-joint system comprises inner and outer concentric rings pivotally interconnected to each other on one transverse axis, pivotally connected to the frame and to the second element on another transverse axis perpendicular to said one transverse axis, and including control means for governing relative motion of said rings, the frame and the second element.

10. The apparatus recited in claim 9 comprising a hollow trunnion for pivotally interconnecting said inner and outer rings on said one transverse axis, and wherein said control means comprises at least one arm having an intermediate fulcrum within said hollow trunnion and a pair of end fulcrums pivotally and slidably connected with the frame and the second element respectively.

11. A torque variator comprising:
a frame;
a first element supported by said frame for rotation on a first axis and supporting for rotation therewith, a pair of axially movable cone-like element having oppositely converging exterior rolling surfaces of revolution defined by curved generatrices to be convex in axial section;
a second element having concentric internal and external respective cylindrical rolling and journal surfaces of revolution about a second axis intersecting said first axis at a point of axes intersection;
a third element rotatable on said first axis and having eccentric journal means to engage said journal surfaces on said second element during nutating movement of said second element in which said second axis revolves in a biconical path about said first axis so that the rolling surfaces of said first and second elements are in rolling frictional engagement at two points in a plane containing said first and second axis and located one on each side of said point of axes intersection, the eccentricity of said journal means being adjustable in the plane of said first and second axes relative to said third element; and
control means between said third element and said journal means to adjustably position said journal means and also to adjust the angle of said first and second axes intersection.

12. The apparatus recited in claim 11, wherein said journal means comprises first and second bearings located on on each side of said point of axes intersection and extensible means connected between diametrically opposite sides of said third member and said first and second bearings.

13. The apparatus recited in claim 12, wherein said extensible means comprises a fluid actuated piston/cylinder device.

14. The apparatus recited in claim 13, including a pump carried by said third member and operable to introduce pressurized fluid to said piston/cylinder device.

15. The apparatus recited in claim 14, including a fluid releasing device also carried by said third element for discharging fluid from said piston/cylinder device.

16. The apparatus recited in claim 12, including a pair of yoke members fixed on said third element, said yoke members each including a pair of leg plates projecting axially to said journal surfaces of said second element and spaced radially therefrom, said journal means having exterior flats slidable in said yoke members.

17. The apparatus recited in claim 11, including a system of U-joints interconnecting said second element and said frame to prevent rotation of said second element on said second axis.

18. The apparatus recited in claim 17 wherein said U-joint system comprises inner and outer concentric rings; means pivotally interconnecting said rings to each other on one transverse axis intersecting said point of axes intersection, means pivotally connecting said outer ring to said frame and said inner ring to said second element on another transverse axis perpendicular to said one transverse axis and intersecting said point of axes intersection and including control means for governing relative motion of said rings, said frame and said second element.

19. The apparatus recited in claim 18 wherein said means for pivotally interconnecting said inner and outer rings on said one transverse axis comprises a hollow trunnion and wherein said control means comprises at least one arm having an intermediate fulcrum within said hollow trunnion and a pair of end fulcrums pivotally and slidably connected with said frame and said second element respectively.

20. A torque transmission comprising:
input torque means;
output torque means;
a frame;
a first element supported by said frame for rotation on a first axis and supporting for rotation therewith, a pair of axially movable cone-like members having oppositely converging exterior rolling surfaces of revolution defined by curved generatrices to be convex in axial section;
a second element having concentric internal and external respective cylindrical rolling and journal surfaces of revolution about a second axis intersecting said first axis at a point of axes intersection;
a third element rotatable on said first axis and having eccentric journal means to engage said journal surfaces on said second element during nutating movement of said second element in which said second axis revolves in a biconical path about said first axis so that the rolling surfaces of said first and second elements are in rolling friction engagement at two points in a plane containing said first and second axes and located one on each side of said point of axes intersection, the eccentricity of said journal means being adjustable in the plane of said first and second axes relative to said third element;
control means between said third element and said journal means to adjustably position said journal means and also to adjust the angle of said first and second axes intersection;
clutch means to releasably couple said input torque means to said third element; and
a multi-speed gear train connecting said first element and said output torque means.

21. The apparatus recited in claim 20 wherein said first element includes a hollow shaft and including a central shaft concentric with said hollow shaft extending throughout the length of the transmission, said central shaft being connected on one end to said input torque means.

22. The apparatus recited in claim 21 wherein said output torque means comprises a counter shaft spaced from and parallel to said first axis.

23. The apparatus recited in claim 20 wherein said control means comprises an extensible piston/cylinder device connected between said third element and said journal means and including further, a combined lubricating/hydraulic fluid system, said system comprising a pump carried by said third element for actuating said piston/cylinder device.

* * * * *

UNITED STATES PATENT AND TRADEMARK OFFICE
CERTIFICATE OF CORRECTION

PATENT NO. : 4,112,780

DATED : September 12, 1978

INVENTOR(S) : Yves Jean Kemper and Lucien Bigot

Figure 4:
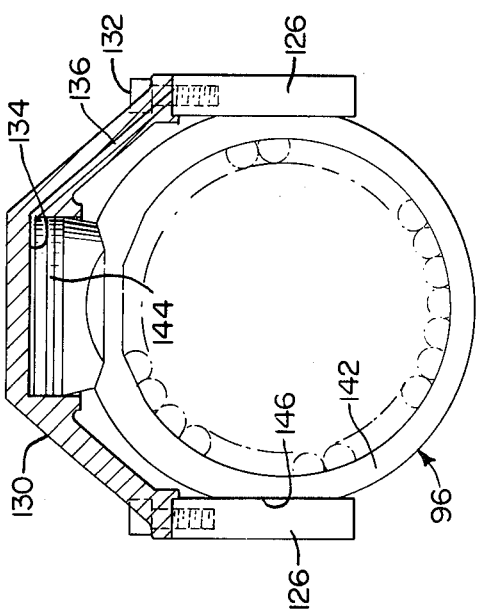
FIG. 4—4 is a fragmentary cross-section on line 4—4 of FIG. 2.

It is certified that error appears in the above-identified patent and that said Letters Patent are hereby corrected as shown below:

Column 1, line 16, "at" should be --of--;

line 34, "element" should be --elements--;

Column 3, line 46, "FIG. 4-4" should be --FIG. 4--;

Column 5, line 52, "as hydraulic" should read --as a hydraulic--;

Column 6, line 68, "nutable" should read --nutatable--;

Column 9, line 10, "orienation" should read --orientation--;

Column 10, line 1, "to moved" should read --to move--;

Column 11, line 52, "diametrical" should read --diametrically--;

Column 12, line 8, "element" should read --members--;

line 35, "on on each side" should read --one on each side--;

UNITED STATES PATENT AND TRADEMARK OFFICE
CERTIFICATE OF CORRECTION

PATENT NO. : 4,112,780

DATED : September 12, 1978

INVENTOR(S) : Yves Jean Kemper and Lucien Bigot

It is certified that error appears in the above–identified patent and that said Letters Patent are hereby corrected as shown below:

line 37, "said third member" should read --said third element--;

line 43, "said third member" should read --said third element--.

Signed and Sealed this

Nineteenth Day of December 1978

[SEAL]

Attest:

RUTH C. MASON
*Attesting Officer*

DONALD W. BANNER
*Commissioner of Patents and Trademarks*